United States Patent [19]
Winterer et al.

[11] Patent Number: 5,226,088
[45] Date of Patent: Jul. 6, 1993

[54] APPARATUS AND METHODS FOR ACTIVE NOISE SUPPRESSION IN STEREO MULTIPLEX SIGNALS

[75] Inventors: Martin Winterer, Gundelfingen; Dieter Baecher, Freiburg, both of Fed. Rep. of Germany

[73] Assignee: SamSung Electronics Co., Ltd., Suwon, Rep. of Korea

[21] Appl. No.: 677,073

[22] Filed: Mar. 29, 1991

[30] Foreign Application Priority Data

Apr. 6, 1990 [EP] European Pat. Off. ............ 90106611

[51] Int. Cl.$^5$ ............................................ H04B 15/00
[52] U.S. Cl. ...................................... 381/94; 381/13; 358/336; 371/65
[58] Field of Search .................... 381/94, 13; 358/314, 358/336; 371/65

[56] References Cited

U.S. PATENT DOCUMENTS

| | | | |
|---|---|---|---|
| 4,501,014 | 2/1985 | Bluthgen | 381/94 |
| 4,574,390 | 3/1986 | Hirohashi et al. | 381/13 |
| 4,689,759 | 8/1987 | Anouar et al. | 381/94 |

Primary Examiner—Jin F. Ng
Assistant Examiner—Edward Lefkowitz
Attorney, Agent, or Firm—Robert E. Bushnell

[57] ABSTRACT

Method and apparatus for active noise suppression in stereo multiplex signals particularly in an automotive radio receiver includes an insertion circuit where the disturbed signal section is replaced with an insertion signal formed by sampled signal values/signal sections which are located before and/or after the disturbed signal section. Basic-delay stages ensure that only those sample values are used for the insertion signal which are separated from the respective instant of insertion by a time interval having an integral relationship nT to the period T of a carrier contained in the stereo multiplex signal (where n is a positive integer).

12 Claims, 4 Drawing Sheets

APPARATUS AND METHODS FOR ACTIVE NOISE SUPPRESSION IN STEREO MULTIPLEX SIGNALS

FIELD OF THE INVENTION

The present invention relates to a method and apparatus for active noise suppression (=aktive Storungsunterdruckung=ASU) in stereo multiplex signals.

BACKGROUND OF THE INVENTION

Ignition signals generated by an automotive engine can interfere with or disturb automotive radio receiver operation. In the automotive receiver after conversion of the incoming signals to the intermediate-frequency (IF) signal, ignition signals result in pulse-type noise. This noise is superimposed on the stereo multiplex signal as, mostly oppositely phased, spikes. The elimination of this noise by conventional low-pass filters is unsatisfactory. Low-pass filtering will stretch the pulses to cause interference in the audible range after the stereo decoding process.

In an article appearing in "Funkschau", No. 25, 1984, pages 57 and 58, an active noise blanker is shown which serves to suppress noise in automotive radio receivers. It includes a circuit which detects such noise pulses caused by the automotive ignition system. By means of an electronic switch in the signal path which opens the signal path during the noise pulse, the disturbed signal is replaced by a stored signal, e.g., from a sample-and-hold circuit. In order that the blanking takes place before the disturbed signal section, the stereo multiplex signal is predelayed by $3 \times 10^{-6}$ seconds with respect to the error detection signal.

In German Patent DE-A-30 28 334, issued on Feb. 11, 1982 and corresponding to U.S. Pat. No. 4,501,014, issued on Feb. 19, 1985, there is disclosed an active noise suppression circuit for briefly disturbed audio signals in which the disturbed signal portion is replaced by a suitable transfer function. The latter is adapted to the undisturbed signal by interpolation. The circuit processes digitized sample values.

European Patent Application 185 692 dated May 3, 1989, discloses a method of eliminating noise in a digitized audio signal. In the case of periodic or non-periodic signals, in one embodiment, the disturbed, short-time signal sections are replaced by a shorter signal section which is removed from the original waveform. In another embodiment there is inserted an adjacent signal section of the same length, with the "joints" being at the zero crossings of the undisturbed signal. The signal sequence is stored or delayed with the aid of a latch using the digitized sequence of sample values. The signal insertion thus corresponds to a short-time signal repetition.

The object of the invention as claimed is to provide an improved method and apparatus for noise suppression in stereo multiplex signals which permits the latter to be decoded in the presence of noise, such as the noise caused by pulses from an automotive ignition system.

The above-mentioned noise suppression techniques relate to audio signals transmitted at radio frequencies, which may also include frequency-modulated signals of the VHF range. The specific problems during stereo decoding which are due to noise-pulse stretching are not addressed. The duration of the disturbed signal section, approximately $5 \times 10^{-6}$ seconds, is of the order of the period of the stereo subcarrier, approximately $26 \times 10^6$ seconds. This refers to a stereo multiplex signal according to the FCC (=Federal Communications Commission) or EBU (=European Broadcasting Union) stereo standard, which is also referred to as "pilot tone method". Noise in the region of the subcarrier has a very disadvantageous effect on the decoding process, and it is an object of the invention to substantially reduce the effect of such noise.

SUMMARY OF THE INVENTION

A method for active noise suppression in stereo multiplex signals where said stereo multiplex signals are disturbed by noise pulse such as occurring in automotive ignition systems and which pulses interfere with the operation of an automotive receiver receiving said stereo multiplex signals, said signal having an insertion interval which includes a disturbed signal section wherein the stereo multiplex signal is replaced with an insertion signal during said insertion interval, an improved method including the steps of sampling said stereo multiplex signal before and after said disturbed signal section to provide sample values, forming insertion signal values from said sample values of said stereo multiplex signal whose time spacing from the instant of insertion is defined by an integral multiple n of the period of a carrier contained in said stereo multiplex signal where nT defines a time interval and where n is a positive integer and inserting said insertion signal values in said stereo multiplex signal during said insertion interval.

BRIEF DESCRIPTION OF THE FIGURES

The invention will now be explained in greater detail with reference to the accompanying drawings, in which.

DETAILED DESCRIPTION OF THE FIGURES

Figure 1:
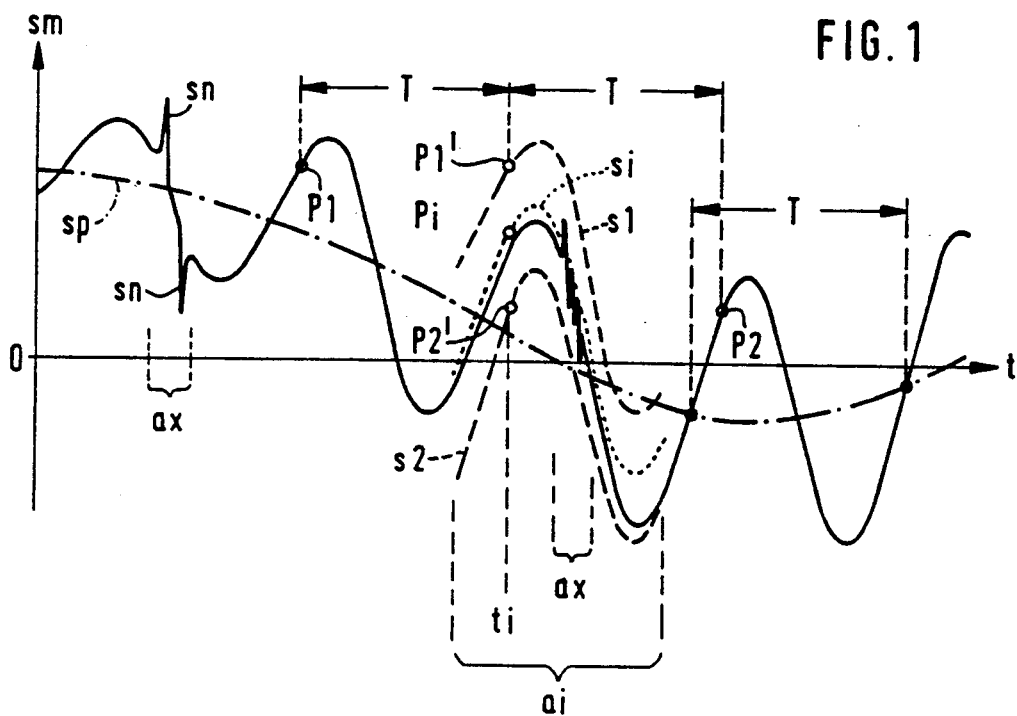
FIG. 1 is a waveform depicting a stereo multiplex signal which is interfered with by noise.

FIG. 1 shows the typical waveform of a stereo multiplex signal sm over a given number of cycles T of the stereo subcarrier. In the signal section ax, ignition interference produces oppositely phased spikes sn, which are separated by a time interval of approximately $5 \times 10^{-6}$ seconds. This section ax is referred to as a disturbed signal section. The mean value sp of the stereo multiplex signal sm is shown as a dash-and-dot line. The two envelopes of the stereo multiplex signal sm represent the two coded stereo channels.

The insertion interval ai includes an additional disturbed signal section ax whose waveform shows the spikes less clearly. If the error detection circuit fd of FIG. 3 detects the noise as such, the signal insertion according to the invention is ensured. For reliable noise suppression, however, the insertion signal si or s1 or s2 must overlap the disturbed signal section ax on both sides.

In the stereo multiplex signal sm shown in FIG. 1, the stereo subcarrier has a large signal component, so that its periodicity is readily apparent in the signal waveform with the period T. This periodicity is utilized for the insertion signal si, s1, s2 as the signal value to be replaced. This second value is replaced at the instant of insertion ti by a signal value which is located one subcarrier period T earlier or later or is derived from these values. In FIG. 1, these are the first and second sample values P1 and P2, which form the first and second insertion values P1' and P2. In the insertion interval ai, the dashed waveform of the first insertion signal s1 thus corresponds to the earlier stereo multiplex signal sm, and the dashed waveform of the second insertion signal s2 corresponds to the later stereo multiplex signal sm. In FIG. 1, for the sake of clarity, the insertion interval ai was placed in a signal portion in which both the mean value sp of the signal and the amplitude of the stereo subcarrier tr vary greatly. In this extreme case, the first and second insertion signals s1, s2 differ considerably from the undisturbed stereo multiplex signal sm. Linear superimposition of these two insertion signals s1, s2, however, results in an insertion signal si (dotted line) which closely approximates the undisturbed waveform. This simple linear superimposition of the two curve sections s1, s2 is advantageously effected in the simple circuit of FIG. 5.

With this type of insertion, it must be ensured that the insertion interval ai overlaps the disturbed signal section ax on both sides. The time duration of the insertion interval is arbitrary. Also, the insertion interval ai need not begin where the stereo multiplex signal sm crosses its mean value sp. This permits an extremely simple circuit implementation of the insertion method: The stereo multiplex signal sm is passed through basic delay stages v with a fixed delay T or an integral multiple thereof, nT, the basic interval, where n = 1, 2, 3, . . . . From the signals tapped from these individual basic-delay stages v, the insertion signal s1, s2, si is formed. The implementation will be particularly simple if the stereo multiplex signal is present as a sampled signal in digital form, because the basic-delay stages can then be implemented with digital data memories.

As long as noise is detected in the stereo multiplex signal sm, switchover to the constantly present insertion signal s1, s2, si is effected. Overlapping is ensured by slightly predelaying the stereo multiplex signal and slightly lengthening the error detection signal fs or the switching signal u, cf. FIG. 3.

Figure 2:
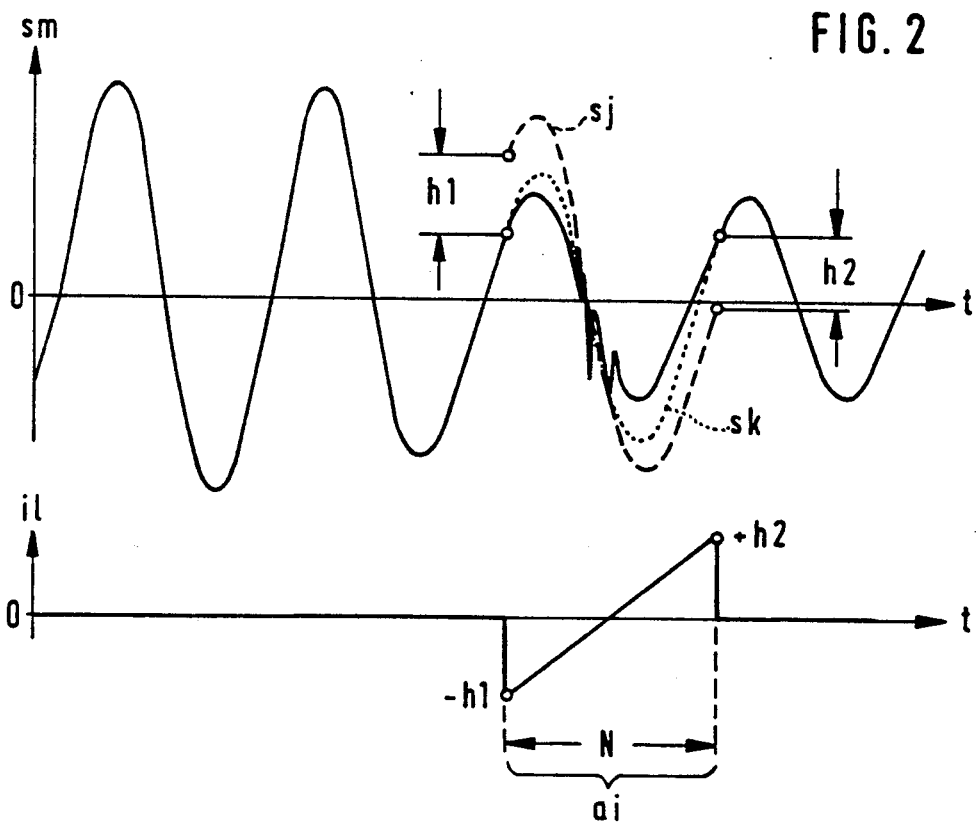
FIG. 2 is shows another stereo multiplex signal having interference.
Figure 7:
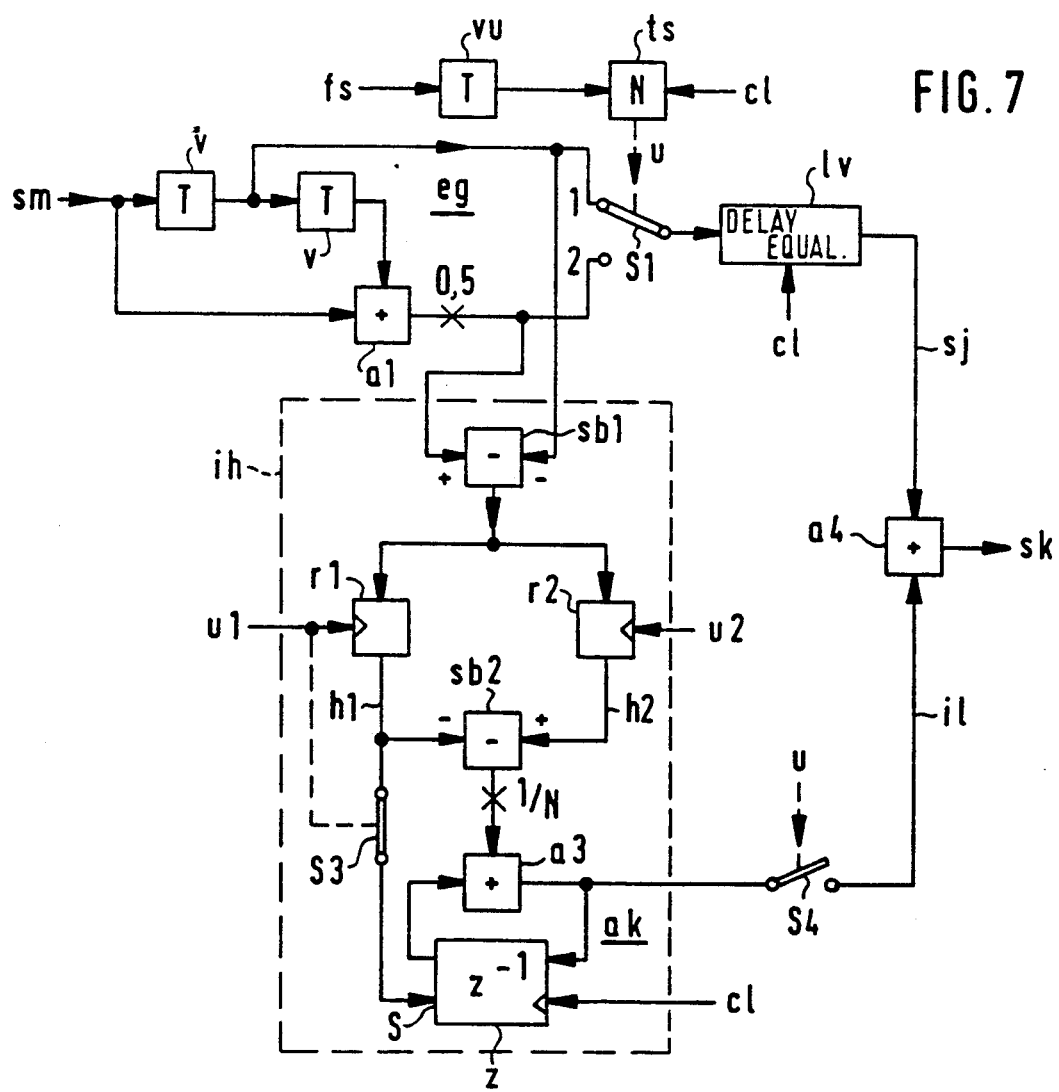
FIG. 7 shows an improved version of the signal insertion circuit of FIG. 5 including an auxiliary interpolator.

FIG. 2 shows schematically the waveform of another disturbed stereo multiplex signal sm with an insertion signal sj (dashed line). At the beginning and end of the insertion interval ai, the insertion signal sj has a first and a second step height h1, h2, respectively, with respect to the original stereo multiplex signal sm. The first and second step heights h1, h2 can be eliminated by a simple linear interpolation, namely by adding the interpolation value i1, shown in the lower part of FIG. 2, to the insertion signal sj. This interpolation value i1 is formed by linear time interpolation of the first and second step heights h1, h2, e.g., by means of a circuit arrangement as shown in FIG. 7. Through this linear interpolation, the interpolated insertion signal sk fits into the stereo multiplex signal sm at the beginning and end of the insertion interval ai without a step.

Figure 3:
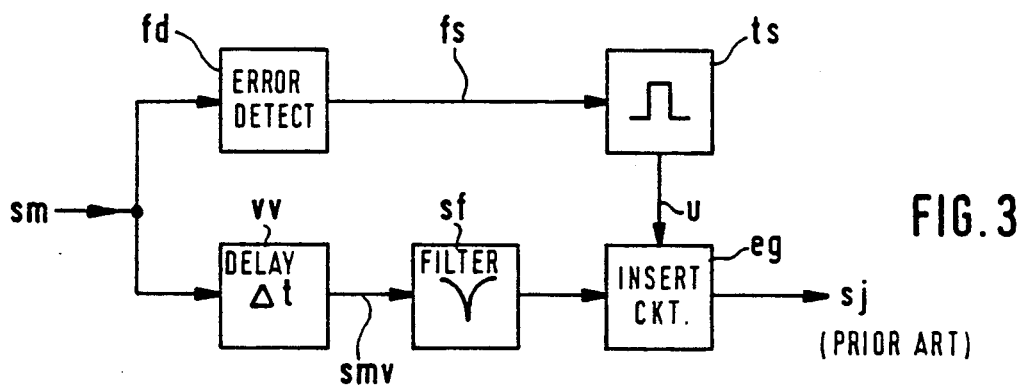
FIG. 3 is a simplified block diagram of an active noise suppression (=ASU) apparatus of the prior art.

FIG. 3 shows the block diagram of an active noise suppression circuit whose fundamental principle is known, for example, from the above-mentioned article in "Funkschau", No. 25, 1984, pages 57 and 58. The stereo multiplex signal sm is checked for noise by means of an error detection circuit fd. The resulting error detection signal fs initiates a switching signal u of a given duration in a timing circuit ts. Simultaneously with the error detection circuit fd, a predelay stage vv is supplied with the stereo multiplex signal sm. It is followed by a rejection filter sf which removes the 19-kHz pilot tone from the composite stereo signal. This pilot tone, which has a large amplitude, adversely affects the active noise suppression and is therefore filtered out. The predelay stage vv delays the stereo multiplex signal so that it will not arrive at the insertion circuit eg earlier than the switching signal u. In the prior art circuit, the insertion circuit eg contains an analog sample-and-hold circuit with a storage capacitor. This sample-and-hold circuit is activated by the switching signal u and delivers as the insertion signal sj the stored analog signal value during the predetermined switching period.

Figure 4:
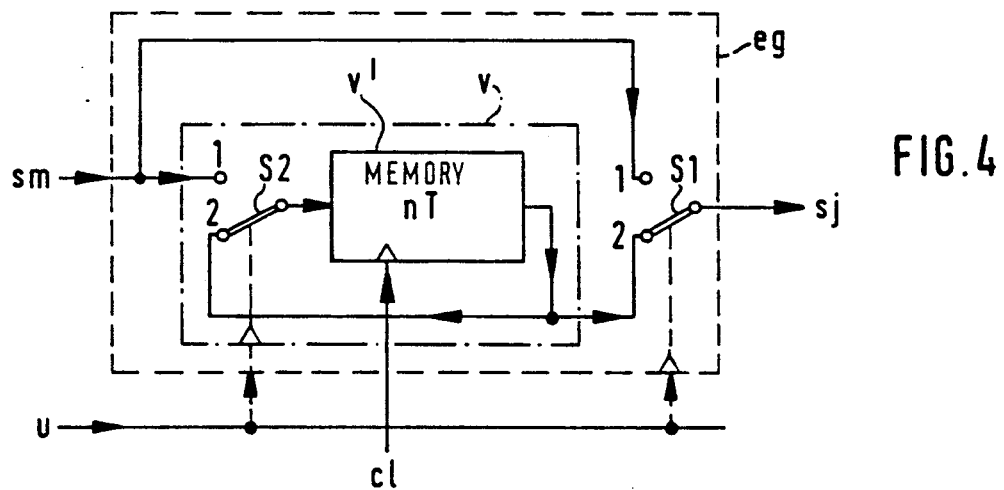
FIG. 4 is a shows a simplified block and schematic representation of the signal insertion apparatus in accordance with the invention.

FIG. 4 shows a simple embodiment of an insertion circuit eg in accordance with the invention. The insertion circuit is employed as the insertion circuit shown in FIG. 3. It contains a basic delay stage v for data whose delay is an integral multiple n of the period T of a carrier pt, tr, vt contained in the stereo multiplex signal sm, where n = 1, 2, 3 . . . . The carrier can be the pilot tone pt, the stereo subcarrier tr, and the traffic information carrier vt at, e g., 19 kHz, 38 kHz, and 57 kHz, respectively cf. FIG. 8.

The basic-delay stage v contains, besides its memory device proper, v', at least one first electronic switch s1 whose first input 1 is supplied with the undelayed stereo multiplex signal sm, and whose second input 2 is supplied with the signal delayed in the memory device v'. The output of the first electronic switch s1 provides the insertion signal sj; the switch is controlled by the switching signal u.

The memory device v', e.g., a shift register or a random-access memory (=RAM), is supplied with the system clock cl, which is also synchronous with the data clock.

The basic-delay stage v may be improved by a second electronic switch S2 in the input of the memory device v'. This electronic switch has its output connected to the input of the memory device v'; its first input 1 is supplied with the undelayed stereo multiplex signal sm, and the second input 2 has applied thereto the output signal from the memory device v'. This switch s2, is controlled by the switching signal u, with the respective switch positions 1, 2 of the first and second electronic switches S1, S2 corresponding to each other.

The second electronic switch s2 ensures that a disturbed stereo multiplex signal sm will not input to the memory device v'. The disturbed sample value is replaced by a sample value preceding it by the basic interval nT. This improvement is of interest if the insertion circuit eg contains at least two series-connected basic-delay stages v.

Figure 5:
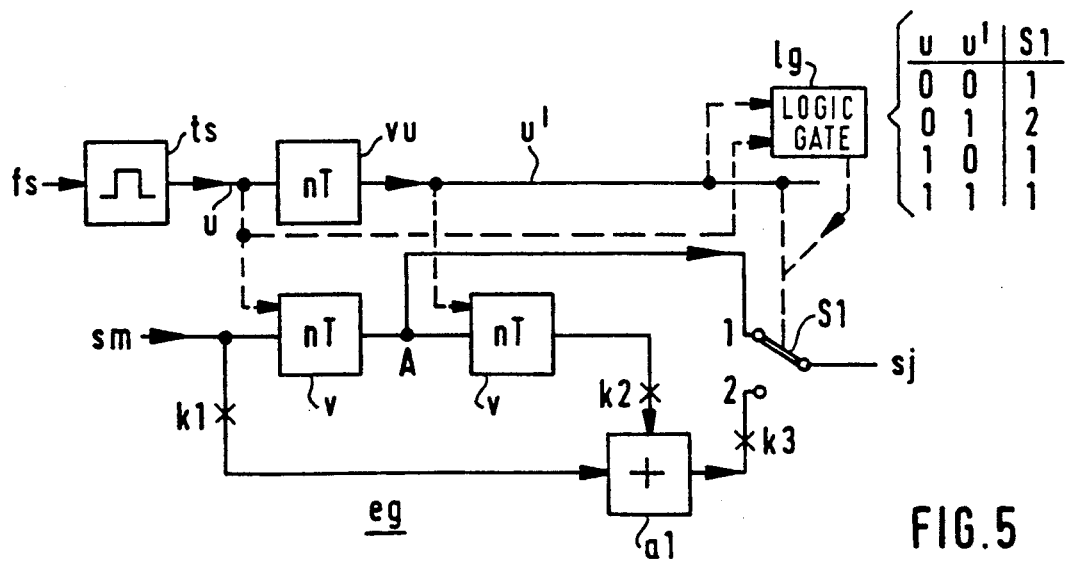
FIG. 5 shows a more detailed block diagram of the signal insertion circuit in accordance with the invention.

FIG. 5 shows a particularly advantageous embodiment of the signal insertion circuit eg in which the insertion signal sj is derived from the linearly superimposed signal sections before and after the disturbed signals section ax, cf. the insertion signal si shown by the dotted line in FIG. 1.

Two series-connected basic-delay stages v delay the stereo multiplex signal sm. The signal delayed by the two basic-delay stages v and the undelayed signal are applied to the two inputs of a first adder a1, for linear combination. The output of the first adder a1 feeds the second input of the first electronic switch s1, which corresponds to the first electronic switch s1 of FIG. 4 and from whose output the insertion signal sj is obtainable. The junction of the two series-connected basic-delay stages v, the tap A, is connected to the first switch input 1. In switch position 1, the undisturbed stereo multiplex signal sm is transferred to the output of the insertion circuit eg after being delayed by the basic interval nT.

The insertion signal for the second switch input 2 is formed by additive superimposition of the undelayed stereo multiplex signal sm and the stereo multiplex signal sm delayed by two basic intervals 2nT. The summing device in FIG. 5 is the first adder a1. The first electronic switch s1 is controlled by the switching signal u', which changes the first electronic switch s1 from the first (1) to the switch position (2) when the stereo multiplex signal sm applied to the first switch input 1 is disturbed. Synchronism between the switching signal u' and the stereo multiplex signal delayed by one basic interval nT is established by a switching-delay stage vu with the basic delay (=basic interval) nT, through which the switching signal u is passed.

The switching signal u is locked to the error signal fs either directly or via a timing circuit ts. The timing circuit ts causes the insertion interval ai to have a fixed predetermined length, e.g., the period T or nT, when a signal section ax is disturbed. The timing circuit ts is also advantageous if the insertion interval ai is to overlap the disturbed signal section ax only a little. Under certain circumstances, the error detection circuit fd detects only the extreme values of the noise signal sn, so that the disturbed signal section is longer than the duration of the error detection signal fs, this must then be compensated.

As a rule, the error detection circuit fd will contain a high-pass filter whose lower cutoff frequency is approximately 100 kHz, i.e., clearly above the useful-signal range. The interfering ignition pulses, however, fall into this high frequency range and can be filtered out there by means of threshold detectors.

As in FIG. 4, each of the basic-delay stages v of FIG. 5 may include a second electronic switch s2 to prevent disturbed signal components from getting into the respective memory device v'. The first input 1 of the second electronic switch s2 is supplied with the input signal for the respective basic-delay stage v, and the second switch input 2 is supplied with the output signal from the respective memory device v'.

In order that the insertion signal sj appearing at the output of the first adder a1 has the same amplitude as the undisturbed stereo multiplex signal sm, the two input signals of the first adder a1 are weighted with a first and second weighting factor k1, k2, respectively, and/or the output of the first adder a1 is weighted with a third weighting factor k3. If k1=k2 =1, then k3=0.5, and if k1=0.5, then k3=1. In the special case where either k1=0 or k2=0, the insertion signal sj is formed only from the signal section before or after the disturbed signal section ax, as in FIG. 4.

Figure 6:
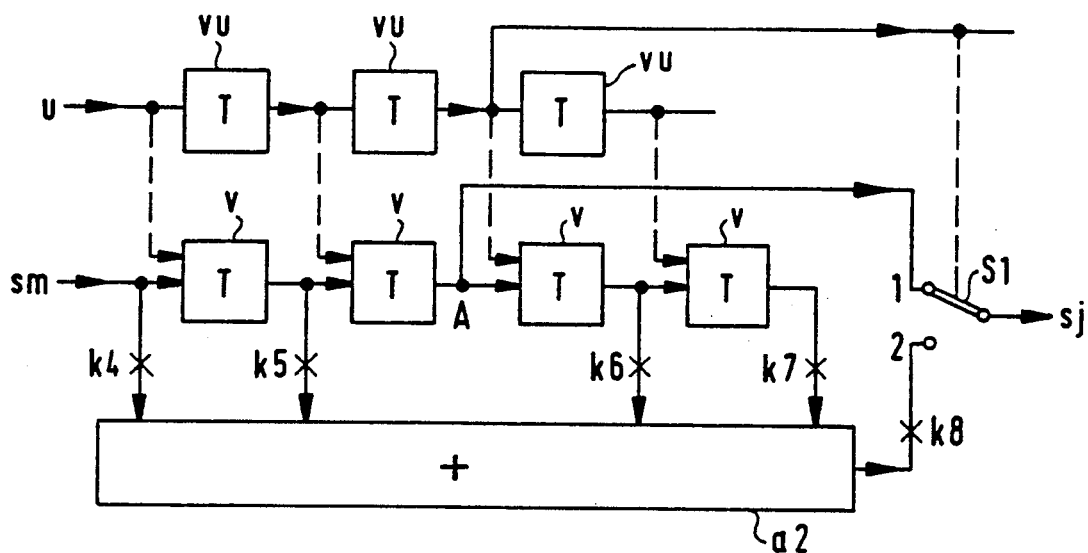
FIG. 6 shows an alternate embodiment of a signal insertion circuit.

FIG. 6 shows a supplement to the embodiment illustrated in FIG. 5. Instead of the two basic-delay stages v of FIG. 5, four basic-delay stages v for the stereo multiplex signal sm are connected in series. Except for the center tap A, all inputs and outputs of these basic delay stages v or their junctions are connected to the inputs of a second adder a2 for summation. The output of this adder, which is weighted with an eight weighting factor k8, is coupled to the second input 2 of the first electronic switch s1. The taps for the stereo multiplex signal sm along the basic-delay-stage chain are modified, in the direction of signal flow, with a fourth, fifth, sixth, and seventh weighting factor k4, k5, k6, and k7, respectively. The tap at the central junction, i.e., the tap A, is coupled to the first input 1 of the first electronic switch s1 unweighted.

The switching signal u is synchronized with the delayed multiplex stereo signal sm by a series combination of three switching-delay stages vu. If each of the basic-delay stages v includes the second electronic switch s2, the control input of the latter will be coupled to the tap of one of the three series-connected switching-delay stages vu. In that case, the delays T or nT of the switching-delay stages and the basic-delay stages v will be equal.

The greater number of taps for forming the insertion signal sj improves the averaging of the latter with respect to the stereo multiplex signal sm in a greater time period. The farther the sample values are away from the disturbed signal section, however, the smaller the weighting factors applied to them should be. The fifth and sixth weighting factors k5, k6 are equal and correspond approximately to the first and second weighting factors k1, k2, respectively, of FIG. 5. The fourth and seventh weighting factors k4, k7 are also equal. With the eighth weighing factor k8, the output of the second adder a2 is brought to the amplitude value of the unmodified stereo multiplex signal sm at the first electronic switch s1.

In the series combination of basic-delay stages v shown in FIG. 5, 6 or 7, it is sufficient to fit only the first basic-delay stage v with the second electronic switch s2. With this simplification, too, the latches in the delay chain will contain no disturbed signal components.

A further improvement results if in the circuit of FIG. 5, a logic gate lg is inserted between the switching-delay stage vu and the control input of the first electronic switch s1. This logic gate lg is to place the first electronic switch s1 in the second switch position 2 only if the switching signal u before the switching-delay stage vu is at logic 0 and the switching signal u' after the switching-delay stage vu is simultaneously at logic 1.

This ensures that in the presence of two successive noise signals spaced nT apart, the second noise signal will not influence the insertion signal sj, namely via the tap with the 1st weighting factor k1.

In the embodiment of FIG. 7, the insertion circuit eg of FIG. 5 was supplemented with an auxiliary interpolator ih. The auxiliary interpolator ih assures that at the beginning and end of the insertion interval ai, the insertion signal sk shows no step change from the undisturbed stereo multiplex signal. To this end, a first and a second sample-and-hold circuit stores the amplitude difference between the second and first inputs 2, 1 of the first electronic switch s1 at the beginning and end of the sampling interval ai. This is done, for example, by means of the first subtracter sb1, whose minuend and subtrahend inputs are connected to the second and first switch inputs 2, 1, respectively, and whose output is coupled to a first and a second buffer r1, r2. By means of the switching start signal u1 and the switching end signal u2, the respective amplitude difference is transferred into the first buffer r1 at the beginning of the switching signal u and into the second buffer r2 at the end of the switching signal u. The stored values thus correspond to the first and seconds step heights h1, h2, respectively, of FIG. 2 From the difference between the two step heights h2, h1, which is formed by a second subtracter sb2, a linear interpolation value i1 is derived, see also FIG. 2, lower half.

The step-height difference h2−h1 is divided by means of a divide-by-N circuit 1/N and an accumulator ak into a staircase signal consisting of N steps, which is added to the insertion signal sj during the insertion interval ai. The accumulated value is formed in the accumulator ak, whose adder, the third adder a3, is supplied with the output signal from the divide-by-N circuit 1/N.

At the beginning of the switching signal u, the set input S of the accumulator register z in the accumulator loop is loaded with the first step height h1. This is done by means of the switching start signal u1 and the first electronic switch s3, which connects the set input s to the output of the first buffer r1 during the switching start signal u1.

The divide-by-N circuit 1/N determines the individual step heights of the interpolation value i1 by the number N of sample values contained in the insertion interval ai. The number N thus depends on the duration of the insertion interval ai and on the sampling rate determined by the system clock c1. For a fixed insertion interval ai, the number N of sampling pulses is fixed, too.

If the duration of the insertion interval ai is variable, the number N of sampling pulses contained in the insertion interval changes. The exact number N, however, can be determined only if the duration of the error signal fs or the switching signal u is known. This requires, for example, an additional delay stage and a time-duration-determining device (not shown in FIG. 7) for determining the exact duration of the disturbed signal section ax before the signal processing illustrated in FIG. 7 is performed. On the other hand, the variations of the ignition interference with time are quite well defined, so that a predetermined, fixed numerical value for the number N of sampling pulses will be fully sufficient for satisfactory interpolation.

After the insertion interval si, a second electronic switch s4 separates the interpolation value i1 from the corrected stereo multiplex signal sk. The second electronic switch s4 is therefore closed only during the switching signal u, connecting the output of the accumulator ak to the input of a fourth adder a4, whose other input is supplied with the uncorrected insertion signal sj and whose output provides the corrected stereo multiplex signal sk. The uncorrected insertion signal sj, outside the insertion interval ai, which is the undisturbed stereo multiplex signal sm, is delayed by a delay equalizer stage lv to synchronize the interpolation value i1 with the insertion signal sj. The delay equalization may be effected, for example, by a shift register controlled by the system clock c1.

In the embodiment of FIG. 7, the switching signal u is derived from the error signal fs by passing the latter through a switching-delay stage vu and then using the delayed signal to trigger a timing circuit ts controlled by the system clock c1. The timing unit in the timing circuit ts may be a counter whose count N is adjustable or preset.

Figure 8:
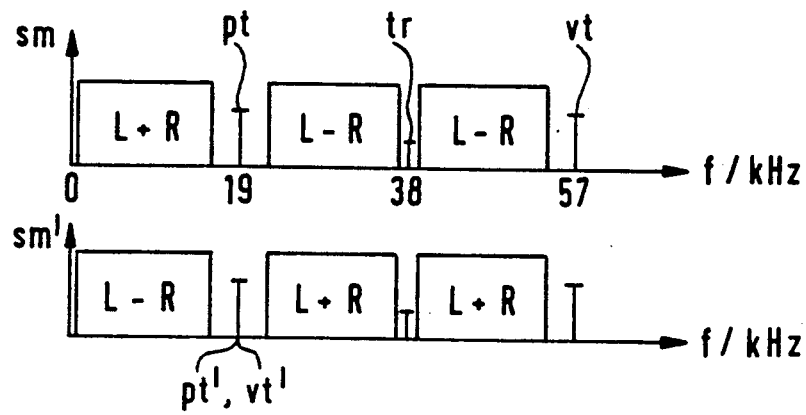
FIG. 8 is a diagram depicting the frequency arrangement of the stereo multiplex signal at baseband and at inverse baseband.

The upper half of FIG. 8 shows the frequency scheme of the stereo multiplex signal sm at baseband. The main channel L+R lies in the frequency range between 30 Hz and 15 kHz, and the subcarrier channel L-R lies between 23 kHz and 53 kHz around the residual subcarrier tr at 38 kHz. The pilot tone is located at 19 kHz, and the traffic information carrier vt, which is narrow-band-modulated with traffic information and identification signals, is located at 57 kHz.

The lower part of FIG. 8 shows the stereo multiplex signal sm' at inverse baseband, where the subcarrier channel L-R lies in the frequency range from 30 Hz to 15 kHz and the main channel L+R lies in the frequency range from 23 kHz to 53 kHz. By converting the stereo multiplex signal at baseband with a carrier tr of 38 kHz, the inverse baseband sm' is obtained, this is done, for example, during the decoding of the stereo multiplex signal. The stereo multiplex signal sm' at inverse baseband contains both the pilot tone pt' and the traffic information carrier vt' at 19 kHz. In this case, too, the frequency range pt, vt' at 10 kHz is advantageously suppressed over a narrow band to above noise-signal stretching by the rejection filter sf (cf. FIG. 3) before the insertion circuit eg.

Figure 9:
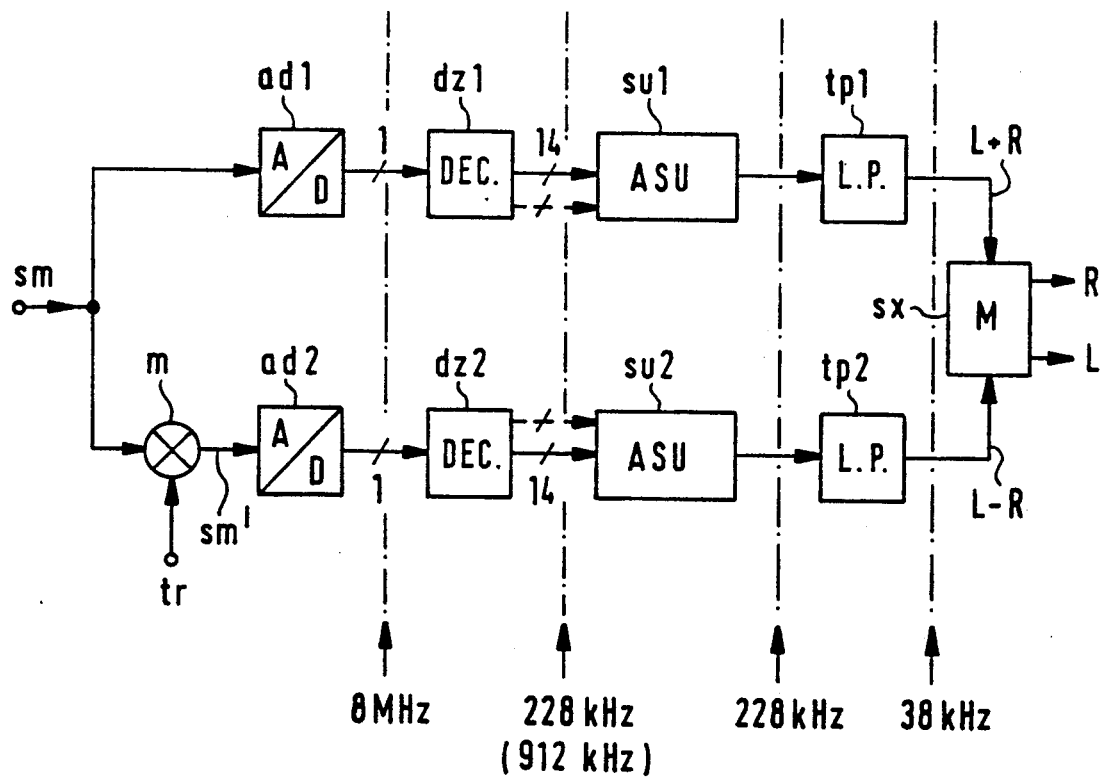
FIG. 9 is a block diagram of a digital stereo-multiplex-signal-processing circuit with an active noise suppression circuit in each of the two signal paths.

FIG. 9 shows schematically a stereo-multiplex-signal-processing circuit with active noise suppression (=ASU) which has a first signal path for the stereo multiplex signal sm at baseband and a parallel, second signal path for the stereo multiplex signal sm' at inverse baseband. The latter signal is derived from the baseband signal by conversion in a mixer m whose other input is supplied with a 38-kHz subcarrier tr. As the further signal processing is digital, the first and second signal paths each contain an analog-to-digital converter ad1, ad2, whose output is a one-bit pulse -density-modulated signal with an 8 MHz clock frequency. By means of a first and a second decimating circuit dz1, dz2, the clock frequency is reduced to 228 kHz, with the data word comprising 14 bits, however. This data signal is supplied to a first and a second ASU su1, su2 in the first and second data paths, respectively. The two ASUs sui1, su2 are completely identical, of course, this would hardly be possible with an analog implementation.

FIG. 9 also shows a data link between the first decimating circuit dz1 and the first ASu su1 and a data link between the second decimating circuit dz2 and the second ASU su2 (dashed lines). These data links are clocked at a multiple of 228 kHz, e.g., 912 kHz. They serve only the error detection circuits fd, which must detect ignition interference in the frequency range above 100 kHz.

At the output of the first ASU su1, the main channel L+R is separated from the composite signal by means of a first low-pass filter tp1, and at the output of the second ASU su2, the subcarrier channel L-R is separated from the composite signal by means of a second low-pass filter tp2. By combining the two signals in the stereo matrix sx, the right and left sound channels R, L are formed. Advantageously, another clock reduction is performed in the first and second low-pass filters tp1, tp2 simultaneously with the low-pass filtering, so that the stereo matrix sx only has to process data with the lower clock rate of 38 kHz.

We claim:

1. In an apparatus for active noise suppression in stereo multiplex signals where said signals are disturbed by noise pulses such as those occurring in an automotive ignition system and which pulses interfere with the operation of an automotive receiver receiving said stereo multiplex signals, said apparatus including an error detection circuit responsive to said stereo for providing an output error signal upon the detection of noise, a timing circuit for providing a switching signal according to said output error signal, delay means responsive to said stereo signal to delay said signal and insertion means responsive to said delayed signal and said switching signal for providing a signal to be inserted into said stereo signal for replacing a portion of said signal as interfered with by said noise pulses, the combination therewith of an improved insertion means comprising:

a first electronic switching means having a first input and second input and operable in response to said switching signal to connect said first input or said second input as the output of said insertion means, delay means having an input for receiving said stereo signal and at least a first output for providing a first delayed version of said signal, and a second output for providing a second delayed version of said signal, with said first input of said switching means coupled to said first output of said delay means, summing means having one input coupled to said second output of said delay means and another input adapted to receive said stereo signal for providing a summed signal at an output with said output coupled to said second input of said switching means, and control means coupled to said switching means and responsive to said switching signal from said timing means for operating said switching means in said first or second positions according to said output error signal.

2. The apparatus according to claim 1, wherein means includes at least one delay stage with a delay equal to a basic timing interval nT, where T is the period of a carrier contained in said stereo signal and where n is a positive integer.

3. The apparatus according to claim 1, wherein said delay means includes a series combination of two or more delay stages.

4. The apparatus according to claim 2, further including a predetermined number of switching delay stages each providing a delay equal to the basic interval nT, for delaying said switching signal.

5. The apparatus according to claim 1, further including weighting factor means coupled to said summing means for affecting the value of said summed signal according to the magnitude of said weighting factor.

6. A circuit arrangement as claimed in claim 2, further comprising:

second electronic switching means having a first input and a second input with the first input being supplied with the stereo multiplex signal, and with the second input being supplied with the output of the basic-delay stage, a memory device contained in the basic-delay stage and having an input connected to the output of said second switching means, switching-delay stages responsive to said stereo signal for controlling the switching rate of said first and second switches.

7. A circuit arrangement as claimed in claim 6, wherein said delay means comprises:

two basic-delay stages connected in series, with the taps at the beginning and at the end of said series combination being connected through weighting devices with equal weighting factors to the inputs of a first adder included in said summing means and having its output coupled to the second input of the first electronic switching means, with said delay sages having a center tap located at the junction of the two basic-delay stages and connected to the first input of said first electronic switching means, and where said switching signal is applied directly to the control input of the second electronic switching means of the first basic-delay stage in the direction of signal flow and through a single switching-delay stage to the control input of the second electronic switching means of the second basic-delay stage and to the control input of the first electronic switch.

8. A circuit arrangement according to claim 1, further including:

a first sample-and-hold circuit and a second sample-and-hold circuit operative to store any signal difference between said second and first inputs (2, 1) of said first electronic switching means at the beginning and at the end, respectively, of the insertion interval determined by said switching signal, a subtracter for providing from a stored second sample-and-hold value and a stored first sample-and-hold value a difference whose value is divided in a dividing circuit by the number of sampling intervals contained in the insertion interval, an accumulator is loaded with the first sample-and-hold value at the beginning of the insertion interval and its input is connected to the output of the dividing circuit, whose output value is transferred into the accumulator on the occurrence of each sampling pulse, and during the insertion interval, the outputs of the accumulator and the first electronic switch are coupled via an electronic switch and directly, respectively, to an adder whose output serves as a corrected stereo multiplex signal with step-free insertion transitions.

9. In an apparatus for active noise suppression in stereo multiplex signals where said signals are disturbed by noise pulses such as those occurring in an automotive ignition system and which pulses interfere with the operation of an automotive receiver receiving said stereo multiplex signals, said apparatus including an error detection circuit responsive to said stereo signal for providing an output error signal upon the detection of noise, a timing circuit for providing a switching signal according to said output error signal, delay means responsive to said stereo signal to delay said signal and insertion means responsive to said delayed signal and said switching signal for providing a signal to be inserted into said stereo signal for replacing a portion of said signal as interfered with by said noise pulses, the combination therewith of an improved insertion means comprising:

a first electronic switching means having a first input and second input, delay means having an input for receiving said stereo signal and at least a first output for providing a first delayed version of said signal, and a second output for providing a second delayed version of said signal, with said first input of said switching means coupled to said first output of said delay means, summing means having one input coupled to said second output of said delay means and another input adapted to receive said stereo signal for providing a summed signal at an output with said output coupled to said summing means for affecting the value of said summed signal according to the magnitude of said weighing factor, and control means coupled to said switching means and responsive to said switching signal from said timing means for operating said switching means in said first or second positions according to said output error signal.

10. A circuit arrangement as claimed in claim 13, further comprising:

second electronic switching means having a first input and a second input with the first input being supplied with the stereo multiplex signal, and with the second input being supplied with the output of the basic-delay stage, a memory device contained in the basic-delay stage and having an input connected to the output of said second switching means, switching-delay stages responsive to said stereo signal for controlling the switching rate of said first and second switches.

11. A circuit arrangement as claimed in claim 14, wherein said delay means comprises:

two basic-delay stages connected in series, with the taps at the beginning and at the end of said series combination being connected through weighing devices with equal weighing factors to the inputs of a first adder included in said summing means and having its output coupled to the second input of the first electronic switching means, with said delay stages having a center tap located at the junction of the two basic delay stages and connected to the first input of said first electronic switching means, and where said switching signal is applied directly to the control input of the second electronic switching means of the first basic-delay stage in the direction of signal flow and through a signal switching-delay stage to the control input of the second electronic switching means of the second basic-delay stage and to the control input of the first electronic switch.

12. A circuit arrangement according to claim 13, further including:

a first sample-and-hold circuit and a second sample-and-hold circuit operative to store any signal difference between said second and first inputs (2, 1) of said first electronic switching means at the beginning and at the end, respectively, of the insertion interval determined by said switching signal, a subtracter for providing from a stored second sample-and-hold value and a stored first sample-and-hold value a difference whose value is divided in a dividing circuit by the number of sampling intervals contained in the insertion interval, an accumulator is loaded with the first sample-and-hold value at the beginning of the insertion interval and its input is connected to the output of the dividing circuit, whose output value is transferred into the accumulator on the occurrence of each sampling pulse, and during the insertion interval, the outputs of the accumulator and the first electronic switch are coupled via an electronic switch and directly, respectively, to an adder whose output serves as a corrected stereo multiplex signal with step-free insertion transitions.

* * * * *

UNITED STATES PATENT AND TRADEMARK OFFICE
CERTIFICATE OF CORRECTION

PATENT NO. : 5,226,088
DATED : JULY 6, 1993
INVENTOR(S) : MARTIN WINTERER AND DIETER BAECHER

It is certified that error appears in the above-indentified patent and that said Letters Patent is hereby corrected as shown below:

On the title page item [73],

Delete:    Assignee:    SamSung Electronics Co., Ltd.
                                          Suwon, Rep. of Korea Insert:    --Assignee:    Deutsche ITT Industries GMBH
                                          Hans-Bunte-Strasse 19,
                                          D-7800 Freiburg
                                          GERMANY--

Signed and Sealed this

Thirty-first Day of October 1995

Attest:

BRUCE LEHMAN

Attesting Officer        Commissioner of Patents and Trademarks